US006514365B1

(12) United States Patent
Tomita et al.

(10) Patent No.: US 6,514,365 B1
(45) Date of Patent: Feb. 4, 2003

(54) FORMATION OF LIGHT-REFLECTING BAR CODE ON END DISC OF PHOTOGRAPHIC FILM SPOOL

(75) Inventors: Akira Tomita, Minami-ashigara (JP); Takao Uchida, Kyoto (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 49 days.

(21) Appl. No.: 09/635,486

(22) Filed: Aug. 9, 2000

(30) Foreign Application Priority Data

Aug. 9, 1999 (JP) .......................................... 11-224972

(51) Int. Cl.⁷ ................................................ B41F 17/20
(52) U.S. Cl. ........................ 156/90; 156/233; 156/234; 156/289; 428/354; 428/344; 428/347
(58) Field of Search .......................... 159/90, 233, 234, 159/230, 289; 428/354, 344, 480, 447

(56) References Cited

U.S. PATENT DOCUMENTS 4,910,087 A * 3/1990 Torii et al. .................. 428/195
5,765,474 A * 6/1998 Esaki et al. .................... 101/4

* cited by examiner

Primary Examiner—Michael W. Ball
Assistant Examiner—Barbara J. Musser
(74) Attorney, Agent, or Firm—Sughrue Mion, PLLC

(57) ABSTRACT

A process for forming a light-reflecting bar code on an end disc of photographic film spool is performed by the steps of placing on the end disc of photographic film spool a hot-stamp film comprising, in order, an adhesive layer, a light-reflecting metal layer, a transparent protective layer, a releasing layer, a support film, and a stain-shielding layer formed of material inhibiting migration of a compound having a low molecular weight from the support film (e.g., compound having a siloxane bonding or deposited inorganic oxide) in such manner that the adhesive layer is brought into contact with the end disc, and pressing for 0.1 to 2.0 seconds a stamper having a heated bar code-stamping die, so as to transfer the light-reflecting metal layer onto the end disc in the form of the bar code.

5 Claims, 2 Drawing Sheets

FORMATION OF LIGHT-REFLECTING BAR CODE ON END DISC OF PHOTOGRAPHIC FILM SPOOL

FIELD OF THE INVENTION

This invention relates to a process for forming a light-reflecting bar code on end disc of photographic film spool.

BACKGROUND OF THE INVENTION

In a known photographic film patrone of APS (i.e., Advanced Photo System), a light-reflecting bar code is generally provided on an end disc (or flange) which is attached to an end of the spool. The light-reflecting bar code gives encoded film data such as film sensitivity and the number of exposed frames, and thereby the film data can be photoelectrically recognized. The light-reflecting bar code can be formed, for example, by the process disclosed in Japanese Patent Provisional Publication No. 8-254794. In the disclosed process, a hot-stamp film having a light-reflecting metal layer such as aluminum foil is pressed onto an end disc of spool by a stamping die having the bar code on its surface, so as to transfer the light-reflecting metal layer onto the end disc in the pattern of the bar code.

Japanese Patent Provisional Publication Nos. 9-14622 and 11-133552 disclose a hot-stamping process and a hot-stamping apparatus for industrially and advantageously forming light-reflecting bar codes on an end disc of spool. The hot-stamping apparatus disclosed in Japanese Patent Provisional Publication No. 9-14622 is shown in the attached FIG. 2. In FIG. 2, the hot-stamping apparatus 20 comprises a fixed holder 21, a movable holder 24 which can move along the direction of arrow, and a stamper (i.e., bar code pattern transfer die) 27 by which a hot-stamp film 10 is pressed onto an end disc of spool. In the apparatus 20, the spool 28 is made to stand in the fixed holder 21 with a tenon 22 and a supporting wall 23 so that the end disc 29 may be placed on the top. The spool 28 standing in the fixed holder 21 is then passed to a fork claw 25 provided on the movable holder 24. The fork claw 25 has an independent cushion member 26, and the cushion member 26 gives constant even force with which the stamper 27 presses the hot-stamp film 10 onto the end disc 29 of the spool 28. (Hereinafter, this force is referred to as "stamping force".) Thus, by means of the hot-stamping apparatus, a light-reflecting bar code can be formed on the end disc. In the process with the hot-stamping apparatus described above, bar code pattern-transferring troubles such as missing foil or forming fins at the foil edge can be avoided. Further, the disclosed bar code pattern-transferring process is also described to give plural light-reflecting bar codes in a relatively short time.

SUMMARY OF THE INVENTION

The applicants have noticed that transferring troubles often occurs when plural light-reflecting bar codes are successively formed on end discs of spools by means of the aforementioned apparatus. In fact, if one stamper is used in the transferring process to form 3,000 to 4,000 light-reflecting bar code patterns on end discs of the corresponding number, transferring troubles remarkably increase (troubles arise twice or more as frequently as those at the beginning). The applicants have studied this problem, and found that stains deposited on the stamper make the stamper surface uneven to cause the troubles. When a light-reflecting bar code is formed in the transferring process (i.e., when the stamper presses a hot-stamp film onto an end disc), the die surface of the stamper is stained. Accordingly, after 3,000 to 4,000 light-reflecting bar codes are formed on end discs (i.e., after the transferring process is repeated 3,000 to 4,000 times), accumulated stains make the die surface uneven and hence make stamping force so uneven as to cause the troubles.

Although the stains on the die surface of the stamper can be removed by washing, the process must be discontinued when the die surface is washed or exchanged. Consequently, the efficiency for producing light-reflecting bar code patterns is considerably impaired.

Accordingly; it is an object of the present invention to provide a process for efficiently forming light-reflecting bar code patterns on end discs of photographic film spools. In the process of the invention, the surface of die surface of the stamper is hardly stained.

The applicants have studied to achieve the object, and finally found that the stains on the-die surface of stamper can be avoided by a hot-stamp film having a stain-shielding layer provided on the face to be brought into contact with the die surface.

The present invention resides in a process for forming a light-reflecting bar code on an end disc of photographic film spool, comprising the steps of:

placing on the end disc of photographic film spool a hot-stamp film comprising, in order, an adhesive layer, a light-reflecting metal layer, a transparent protective layer, a releasing layer, a support film, and a stain-shielding layer formed of material inhibiting migration of a compound having a low molecular weight from the support film in such manner that the adhesive layer is brought into contact with the end disc and pressing for a period of 0.1 to 2.0 seconds a stamper which has a bar code-stamping die heated to 150 to 200° C. so as to transfer the light-reflecting metal layer onto the end disc in the form of the bar code.

The support film of the hot-stamp film is preferably made of polyester resin, and the material inhibiting migration of a compound having a low molecular weight from the support film preferably is a compound having a siloxane bonding or deposited inorganic oxide.

DETAILED DESCRIPTION OF THE INVENTION

Figure 1:
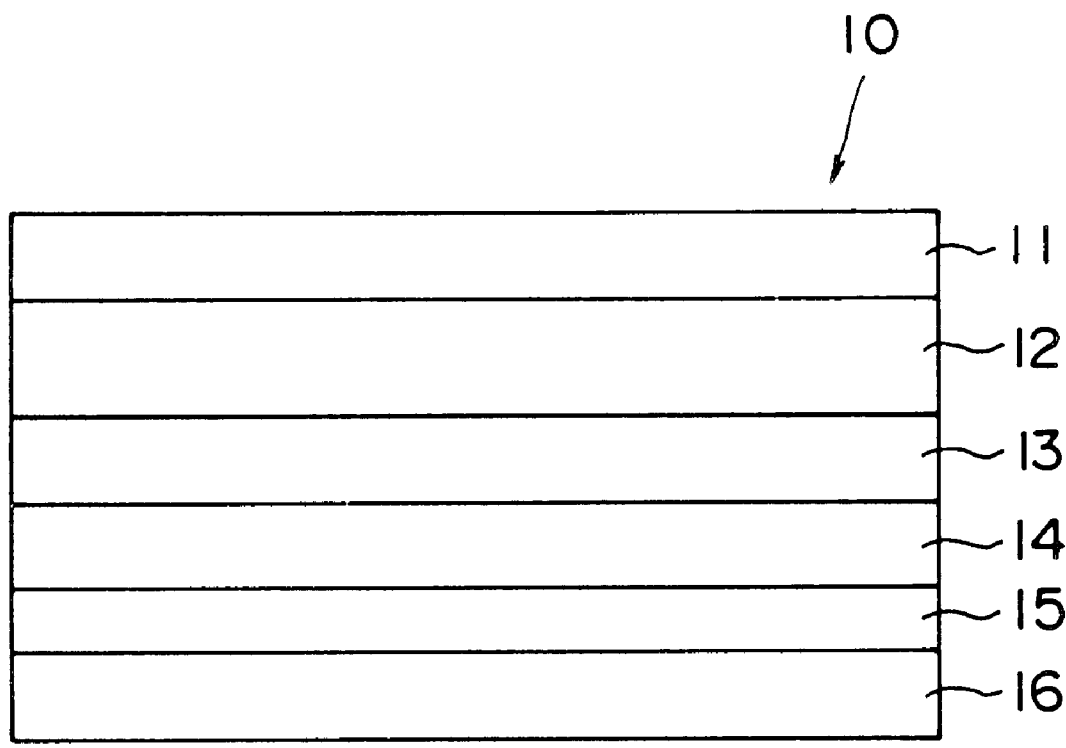
FIG. 1 shows a schematic sectional view of an example of the hot-stamp film used in the process of the invention.

FIG. 1 shows a schematic sectional view of an example of the hot-stamp film used in the process of the invention. In FIG. 1, a hot-stamp film 10 comprises a stain-shielding layer 11, a support film 12, a releasing layer 13, a transparent protective layer 14, a light-reflecting metal layer 15, and an adhesive layer 16. The releasing layer 13, the transparent-protective layer 14, the light-reflecting metal layer 15 and the adhesive layer 16 are formed in order on one face of the support film 12 (i.e., base film), and the stain-shielding layer 11 is formed on the other face of the support film 12 to prepare the hot-stamp film 10. Each layer and film of the hot-stamp film is described below.

The stain-inhibiting layer 11 does not melt or decompose when it is pressed for a period of 0.1 to 2.0 seconds by the die surface heated at 150 to 200° C. The stain-shielding layer 11 can be formed by various processes such as applying and drying a coating liquid dissolving an appropriate material, ion beam irradiation process, chemical reaction deposition process and physical deposition process. From the viewpoint of production cost, the layer 11 is preferably formed by applying and drying the coating liquid. As the coating process for applying the liquid, various known processes such as gravure roll coating can be used. After drying the liquid, it may be hardened by heating or by irradiating with rays of far infrared, infrared or ultraviolet. The stain-shielding layer preferably has a thickness of 0.05 to 5.0 $\mu$m, more preferably 0.1 to 1.0 $\mu$m, if it is formed by applying and drying the coating liquid or by ion beam irradiation process. If the layer is formed by chemical reaction deposition process or by physical deposition process, the thickness preferably is 5 to 100 nm, more preferably 20 to 70 nm.

The stain-shielding layer is preferably formed, for example, by chemical reaction deposition or physical deposition of an inorganic compound such as silicon oxide, aluminum oxide or silicon nitride. It is also preferred to form the layer by applying and drying a coating liquid dissolving a siloxane bond-having compound such as silicone resin or a organic polysiloxane derivative.

Typical examples of the organic polysiloxane derivatives are those having the following formulas (1) to (3):

Organic polysiloxane derivative (1)

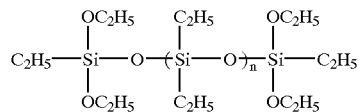

[n is an integer of 2 to 10]

Organic polysiloxane derivative (2)

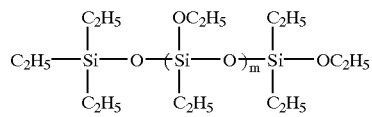

[m is an integer of 2 to 10]

Organic polysiloxane derivative (3)

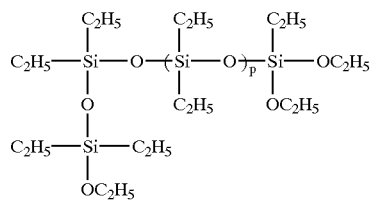

[p is an integer of 2 to 10]

The organic polysiloxane derivatives (1) to (3) may be used singly or in combination.

The support film 12 may be a conventional film used as a base film for known hot-stamp films. Examples of the film employable as the support film include polyester films such as films of polyethylene terephthalate, polybutylene terephthalate, polyethylene naphthalate and copolymer of polyethylene terephthalate and isophthalate; polyamide film; synthetic resin films such as cellulose acetate film; and films of machine-made paper (e.g., cellophane, glassine paper), Japanese paper and composites thereof. A polyester film, particularly a polyethylene terephthalate film, is preferred in consideration of thermal stability and dimension stability. The support film preferably has a thickness of 10 to 30 $\mu$m.

The releasing layer 13 can be formed by the steps of coating the support film with a coating liquid in which a material such as synthetic resin, wax and a surface active agent is dissolved in a solvent according to known coating processes such as gravure roll coating, and drying (and, if needed, hardening by heating or by irradiating with rays of far infrared, infrared or ultraviolet). Examples of the synthetic resins include acrylic resins, urethane resins, urethane-acryl copolymers, melamine resins, urea resins, urea-melamine resins, silicone resins, cellulose resins and benzoguanamine resins. Examples of the waxes include paraffin wax and ester wax. The releasing layer preferably has a thickness of 0.01 to 0.15 $\mu$m.

The transparent protective layer 14 can be formed by the steps of coating the releasing layer with a coating liquid in which synthetic resins (such as acrylic resins, urethane resins, urethane-acryl copolymers, melamine resins, urea resins, urea-melamine resins, silicone resins, cellulose resins, rosin modified maleic acid resins, benzoguanamine resins and mixture thereof) are dissolved in a solvent according to known coating processes such as gravure roll coating, and drying (and, if needed, hardening by heating or by irradiating with rays of far infrared, infrared or ultraviolet). The protective layer preferably has a thickness of 1 to 5 $\mu$m.

The light-reflecting metal layer 15 is made of a light-reflecting metal. Examples of the light-reflecting metals include aluminum, chromium, nickel, titanium, gold, silver, platinum, zinc, silicon and an alloy thereof. The layer can be formed by known film-forming processes such as vacuum deposition process, spattering process and ion-plating process. Generally, aluminum foil formed by vacuum deposition process is used. The light-reflecting metal layer preferably has a thickness of 30 to 120 nm.

The adhesive layer 16 is made of an organic solvent-soluble adhesive agent, an emulsion adhesive agent or a water-soluble adhesive agent. The organic solvent-soluble adhesive agent mainly comprises resins such as acrylic resins, vinyl acetate resins, vinyl chloride resins, styrene-butadiene copolymers, acryl-styrene copolymers, vinyl chloride-vinyl acetate copolymers, polyester resins, chlorinated rubbers, chlorinated polypropylene, urethane resins or mixtures thereof. The layer can be formed by coating the light-reflecting metal layer with the adhesive agent according to known coating processes such as gravure roll coating, and drying. The adhesive layer preferably has a thickness of 0.5 to 5 $\mu$m.

A light-reflecting bar code is formed from the hot-stamp film onto an end disc of photographic film spool by the pattern-transferring process by means of a hot-stamping apparatus. In the process, the hot-stamping apparatus disclosed in Japanese Patent Provisional Publication Nos. 9-14622 and 11-133552 can be used. The stamper (or die surface) is heated to a temperature of 150 to 200° C., preferably 160 to 180° C. The period of time for which the hot-stamp film is pressed by the stamper (or die surface) is in the range of 0.1 to 2.0 seconds, preferably 0.2 to 0.6 second. There is no specific limitation with respect to the material of the stamping die. Examples of the material include metals (such as brass and copper alloy) and rubbers (such as silicone rubber and fluororubber). In consideration of hardness and thermal conductivity, brass is preferred.

EXAMPLE 1

(1) Preparation of Hot-stamp Film

Onto one face of a polyethylene terephthalate film (support film) of 12 $\mu$m thick, a coating liquid in which ester wax was dissolved was coated by the gravure roll coating process. The coated liquid was dried to form a releasing layer of 50 nm thick. The releasing layer was then coated with a solution in which rosin modified maleic acid resin, urea-melamine resin and polyisocyanate (hardening agent) were dissolved, according to the gravure roll coating process, and the coated solution was then dried to form a protective layer of 1.1 μm thick. On the protective layer, an aluminum layer (light-reflecting metal layer) of 50 nm thick was formed by vacuum deposition process. The aluminum layer was further coated with a coating solution in which acrylic resin, acrylstyrene resin and vinyl chloride-vinyl acetate copolymer resin were dissolved, according to the reverse roll coating process, and the coated solution was then dried to form an adhesive layer. Onto the other face of the polyethylene terephthalate film (support layer), a coating solution in which the organic polysiloxane derivatives of the formulas (1) to (3) in a mixed solvent of isopropyl alcohol and n-butanol (content of the organic polysiloxane derivatives: 5 wt. %) was coated by the gravure roll coating process. The coated solution was dried with hot blow, and then further dried with far infrared rays to form a stain-shielding layer. Thus, a hot-stamp film was prepared.

Figure 2:
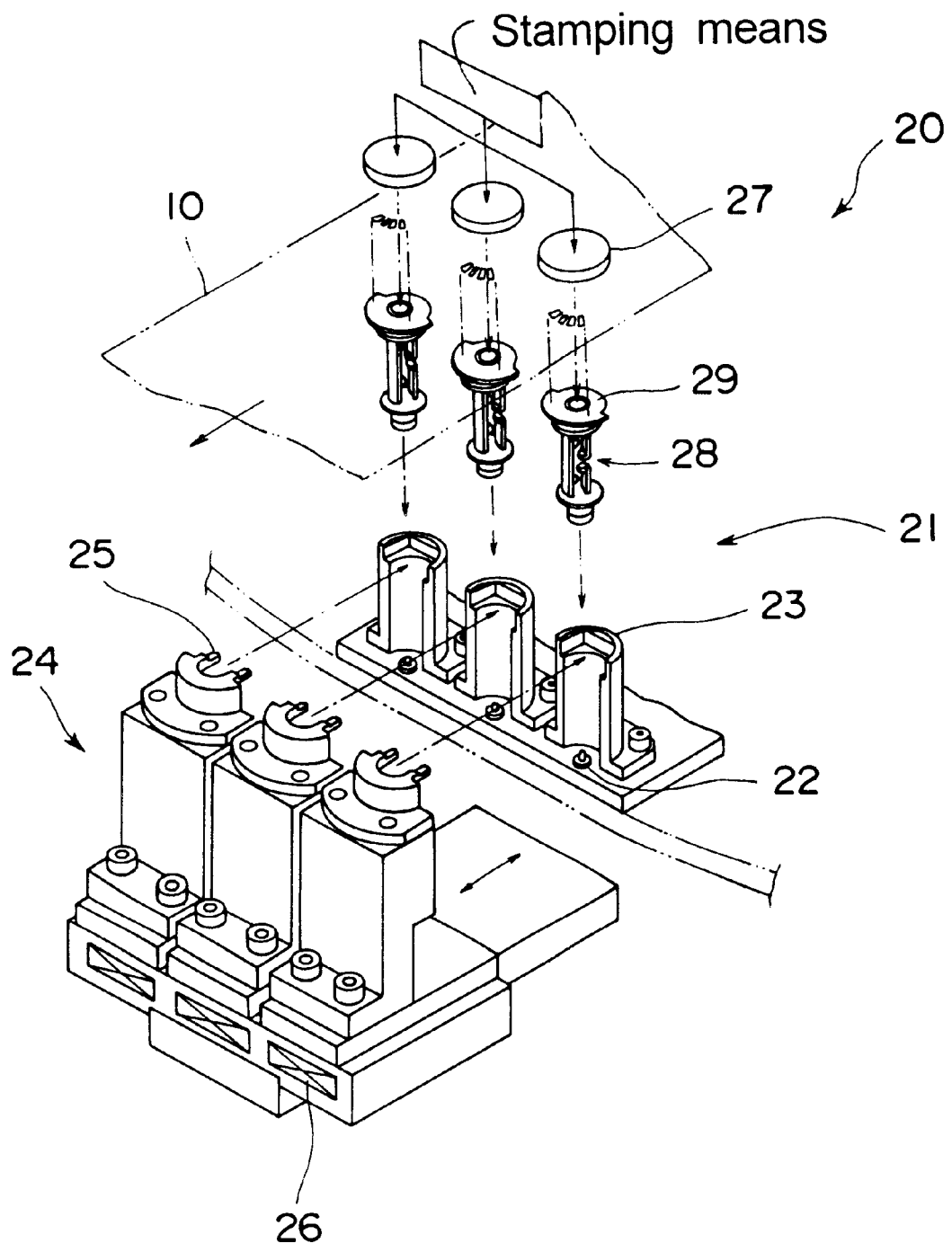
FIG. 2 shows a schematic view of the hot-stamping apparatus disclosed in Japanese Patent Provisional Publication No. 9-14622.

(2) Process for Forming Light-Reflecting Bar Codes on End Discs of Photographic Film Spools The above-prepared hot-stamp film was placed in the hot-stamp apparatus shown in FIG. 2, and then light-reflecting bar code pattern was successively formed on end discs of photographic film spools by the transferring process. The formed bar code patterns were observed, and the number of the stamped end discs were counted until the transferring troubles arose twice or more as frequently as those at the beginning. In the process, a brass stamper die was used and heated at 170° C., and the hot-stamp film is pressed by the stamper die for 0.4 second to form each bar code. The result is set forth in Table 1.

COMPARISON EXAMPLE 1

A hot-stamp film was prepared by the process of Example 1, except that no stain-shielding layer was formed. Using thus prepared hot-stamp film, the procedure of Example 1 was repeated to successively form the light-reflecting bar code pattern on end discs of photographic film spools by the transferring process. The formed bar codes were observed, and the number of the stamped end discs were counted until the transferring troubles arose twice or more as frequently as those at the beginning. The result is also set forth in Table 1.

TABLE 1

| | number of end discs |
|---|---|
| Example 1 | 60,000 |
| Comparison Example 1 | 3,000 |

The results given in Table 1 indicate that the stain-shielding layer on the hot-stamp film increases the number of the stamped end discs by about 20 times or more until the transferring troubles arise frequently. Accordingly, if the hot-stamp film having the stain-shielding is used in the process for forming light-reflecting bar codes, the frequency of washing the stamper die surface can be reduced by 1/20 or less.

Consequently, the process of the invention enables one stamper die to stamp increased number of light-reflecting bar codes onto end discs of spools without increasing the transferring troubles. Further, since the frequency of washing the stamper die surface can be reduced, the production efficiency is improved and the stamper die surface hardly wears away.

What is claimed is:

1. A process for forming a light-reflecting bar code on an end disc of photographic film spool, comprising the steps of:

placing on the end disc of photographic film spool a hot-stamp film comprising, in order, an adhesive layer, a light-reflecting metal layer, a transparent protective layer, a releasing layer, a support film of polyethylene terephthalate or polyethylene naphthalate, and a stain-shielding layer formed of a compound having a siloxane bonding or of deposited inorganic oxide in such manner that the adhesive layer is brought into contact with the end disc and pressing for a period of 0.1 to 2.0 seconds a stamper which has a bar code-stamping die heated to 150 to 200° C. so as to transfer the light-reflecting metal layer onto the end disc in the form of the bar code.

2. The process of claim 1, wherein the bar code-stamping die is heated to 160 to 180° C.

3. The process of claim 1, wherein the hot-stamp film is pressed by the stamper in a period of 0.2 to 0.6 second.

4. The process of claim 1, wherein the stain-shielding layer is formed of an organic polysiloxane compound having one of the following formulas (1) to (3):

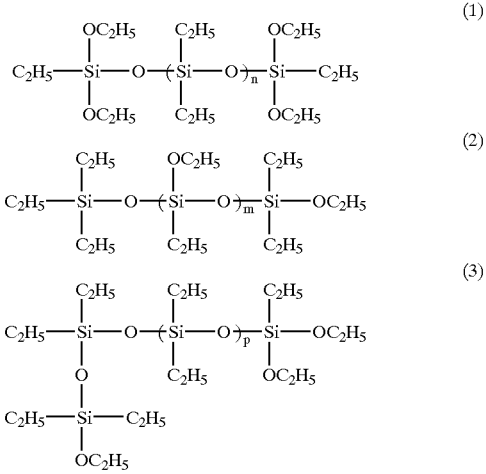

in which each of m, n, and p is an integer of 2 to 10.

5. The process of claim 1, wherein the stain-shielding layer is formed of an organic polysiloxane compound.

* * * * *